(No Model.) 4 Sheets—Sheet 1.
M. WHELESS.
ELECTRICAL RAILWAY CONDUIT SYSTEM.
No. 438,262. Patented Oct. 14, 1890.
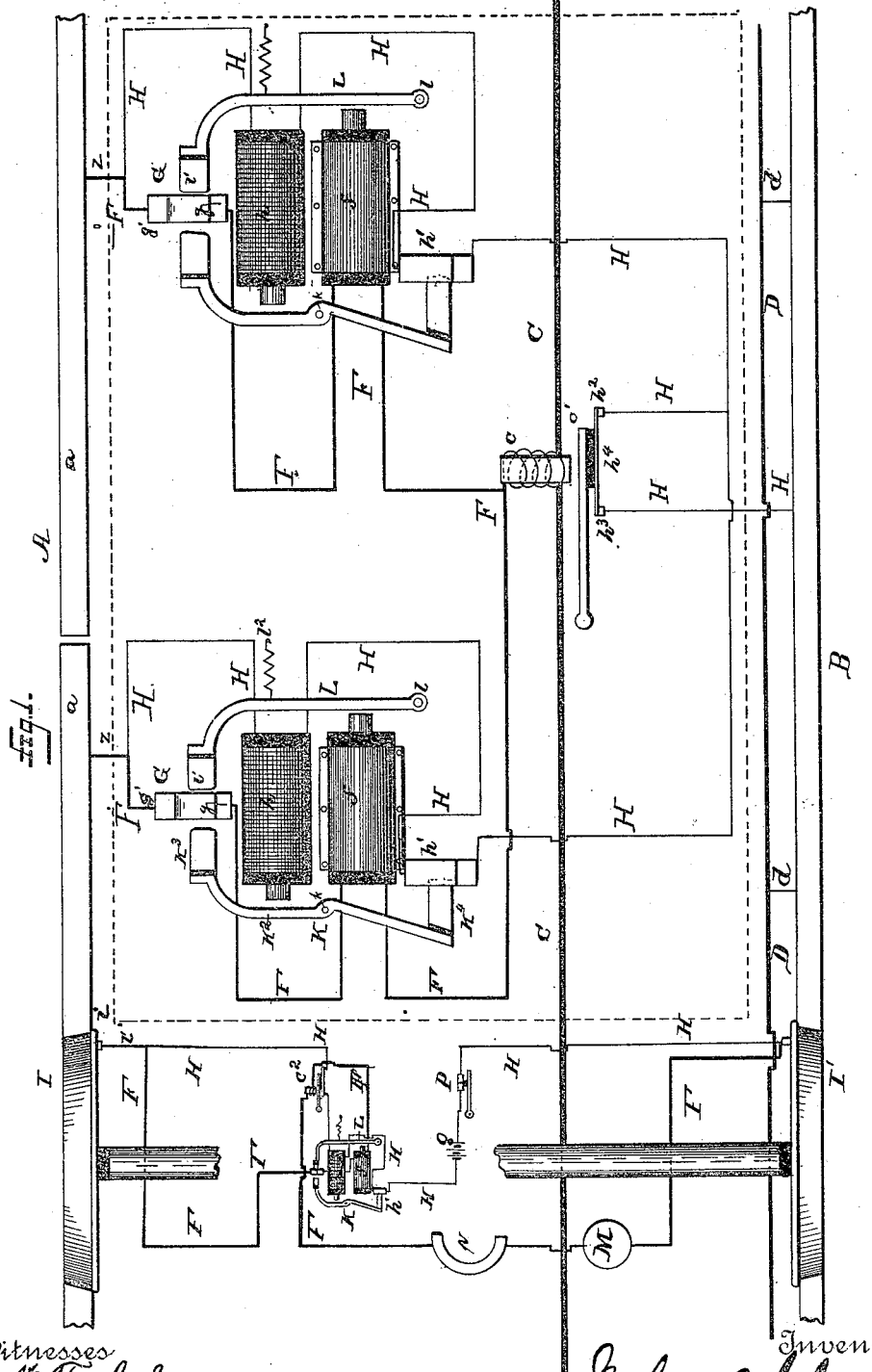
Witnesses
J. M. Fowler Jr
W. W. Grayson
Inventor
Malone Wheless.
By Attorneys
W. H. Singleton.

(No Model.) 4 Sheets—Sheet 2.
M. WHELESS.
ELECTRICAL RAILWAY CONDUIT SYSTEM.
No. 438,262. Patented Oct. 14, 1890.
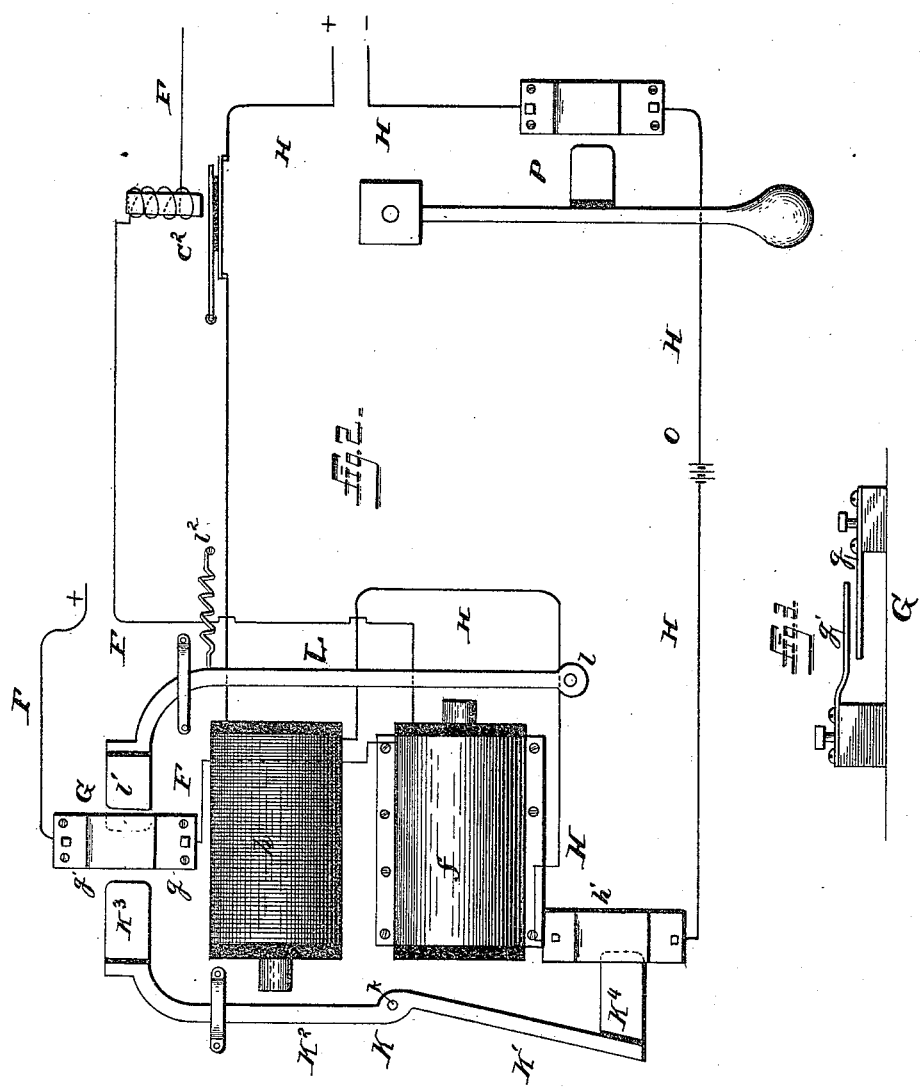

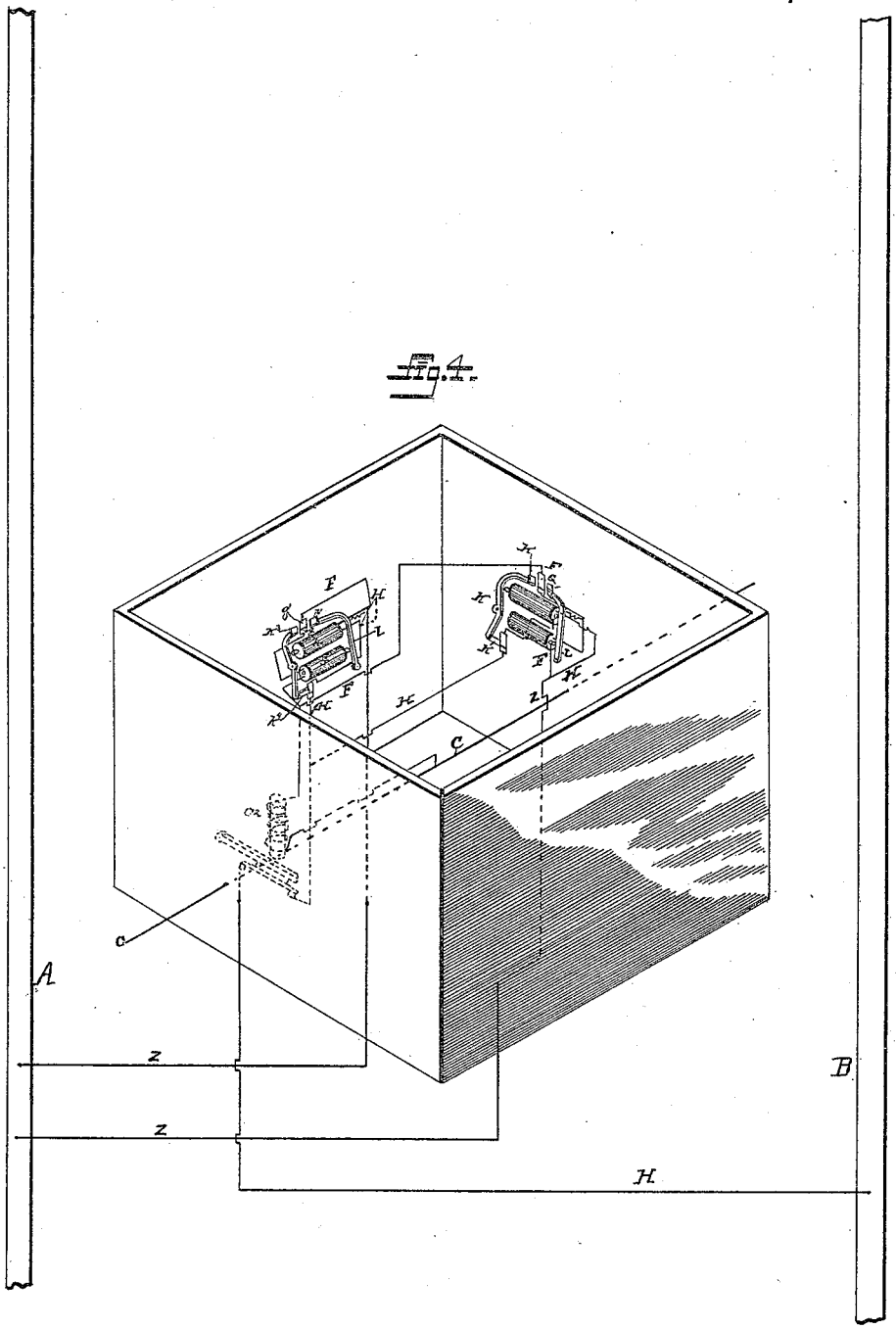

(No Model.) 4 Sheets—Sheet 4.
M. WHELESS.
ELECTRICAL RAILWAY CONDUIT SYSTEM.
No. 438,262. Patented Oct. 14, 1890.
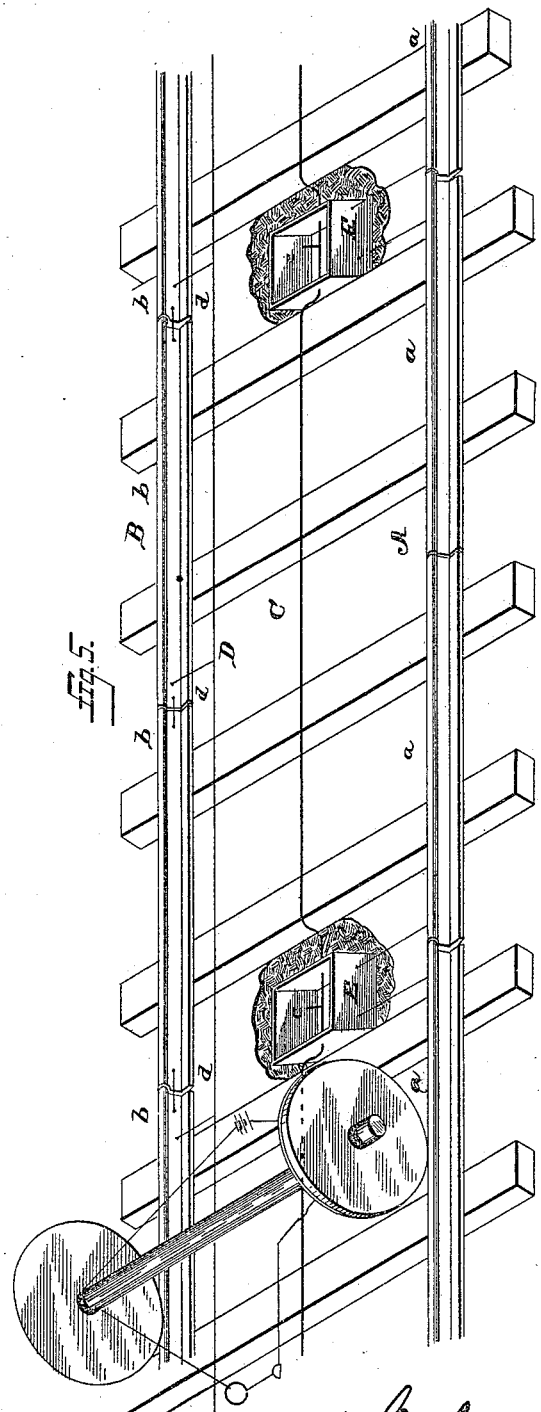

UNITED STATES PATENT OFFICE.

MALONE WHELESS, OF NASHVILLE, TENNESSEE, ASSIGNOR, BY DIRECT AND MESNE ASSIGNMENTS, TO THE WHELESS ELECTRIC RAILWAY COMPANY, OF ALEXANDRIA, VIRGINIA.

ELECTRICAL-RAILWAY-CONDUIT SYSTEM.

SPECIFICATION forming part of Letters Patent No. 438,262, dated October 14, 1890.

Application filed February 8, 1890. Serial No. 339,722. (No model.)

*To all whom it may concern:*

Be it known that I, MALONE WHELESS, a citizen of the United States, residing at Nashville, in the county of Davidson and State of Tennessee, have invented certain new and useful Improvements in Electrical-Railway-Conduit Systems; and I do hereby declare the following to be a full, clear, and exact description of the invention, such as will enable others skilled in the art to which it appertains to make and use the same.

Figure 1 is a plan view of the system, showing the relation of the switches to the power, local, and motor circuits. Fig. 2 is an enlarged plan view of the switch on the car and the relation of the motor and local circuits on the car. Fig. 3 shows a "break." Fig. 4 is a perspective view of a "trap." Fig. 5 represents in perspective the adaptation of the system to a line of track.

The object of the invention is to control the motor-current and the local current on an electric street-railway car. The car carries a cell or battery for the purpose of vitalizing a magnet, placed in a conduit or other suitable place, said magnet performing the function of leading the motor-current from the power-line to the rail and thence through a motor on the car.

It is contemplated in the system herein shown that the current is taken up from the rail and that an insulated wheel must be used. Where an insulated wheel is used, the current must be carried from one wheel through the lightning-arrester, through the rheostat, and thence through the motor to the other wheel, where it is grounded. It is evident that a battery on a car must be placed in the circuit above indicated, or must have a circuit of its own extending from one wheel to the other. The object of a local battery is to vitalize the magnet in the conduit, such vitalization bringing up the armature of the magnet, thereby making a connection between the rail and power circuit. It is evident that directly or indirectly this is the only function which can be bestowed upon a magnet used for the purposes above indicated, and the magnet has no capacity to work outside of the fact of its capacity to draw its armature. Such armature is to be used to plug or switch a circuit in the conduit, so that the current from the power-line laid in a conduit can be sent out to the rail and thence through the car.

The difficulties attendant upon the proper use of a battery on a car serving to vitalize the magnet in a conduit are great. This statement is made after a practical experience with a working-car. If it is attempted to insert the battery in the motor-line, the battery must then work through the motor and the rheostat before it can vitalize the magnet in the conduit. The high resistance which is given to the rheostat which has to accommodate five hundred volts of current forbids the use of a battery on this line with any practical results, for the reason that the local current cannot sufficiently vitalize the magnet to pull the armature with the power necessary to give the pressure on the contact-point where a heavy current has to pass through, and the number of cells to be carried on a car necessary to produce a good effect on the magnet in this instance would be so great that they would become burdensome on the car and add many hundred pounds to its weight. In short, to get a good effective result through a rheostat and motor from a magnet wrapped with No. 10 wire would require almost enough battery-power to put the car in motion. On the other hand, if we put in a separate line for the battery, the ends of the battery-line must come to the disks on the wheels where the ends of the motor-line come. We are confronted then with a difficulty of a metallic circuit from one wheel to the other, in which event the use of a local battery on a car would insufficiently vitalize the magnets in the conduit, and would preferably take metallic route from one wheel to the other on the car. Again, if we attempt to work the battery on a separate line from one wheel to the other, the instant we close the battery-circuit it becomes a metallic route from one wheel to the other, and as a consequence the power-circuit, when it rushes up through the wheel by the fact of its being connected to the power-line through the agency of the magnet, dashes through the battery to the ground, and as a consequence finds a route of very little resistance, and this route of low resistance opens the automatic cut-out at the generator, and as a consequence the power is automatically cut off and the car cannot be put in motion. In short, a metallic circuit is established from one pole of the generator to the other pole of the generator, and if the power were not cut out the generators would burn out, and in either of them the result would be to deprive the motor on the car of current. It is evident, then, that the power-current must be brought into the motor through the rheostat, where it has such a resistance that the motor has time to accommodate itself to the pressure necessary to overcome the inertia of the car. If this were not the fact and the current should be led into the motor without first being drawn through a higher resistance, the motor would at once partake of such a violent start as to burn out its armature or otherwise injure its construction. The practical method of working, then, is such a system as leaves the motor and its relations to the generator at the power plant unimpaired, and this is done under my system of handling the two currents, which is shown and fully explained herein.

In the annexed drawings, the letters A and B indicate two lines of conductors, in the present instance two lines of railroad-rails. Of these one line A should have the sections or rails $a$ electrically insulated from one another. The other line B should preferably have its sections $b$ electrically connected, forming a continuous conductor. Running along coincident with these lines of conductors are the insulated electric conductor or power-line C, duly connected with a generator or other source of power, and the uncovered return-conductor or "ground-wire" D. The presence of the latter is not absolutely necessary; but it is preferable as giving a better return-circuit. At convenient distances this return-wire D is connected to the continuous conductor B by short wires $d$. The power-line C passes in and out of traps E, arranged along the line. These traps E contain the switches, hereinafter to be explained. There may be any number of these traps, one for each switch, or any number of switches may be placed in a trap. Of the switches there is one for each section $a$, and hence the number of traps will be determined by convenience in applying the switches and their connection to the line of conductors A. In the drawings the traps are illustrated as one trap to every two sections $a$, and they will be so described, as this is an easy way of illustrating the system.

When the power-line C enters a trap, it passes around a magnet $c$ and goes on to the next trap. Connected to the power-line C at this magnet $c$ is a line-wire F, which passes around another magnet $f$ and thence to one side $g$ of a break G. From the other side $g'$ of the break G the line-wire F passes to the conductor-line A. This line-wire F, for convenience, is connected to the conductor-line A by a connecting-wire $z$, connected to another line-wire H. This line-wire H passes around a magnet $h$, and thence to a break $h'$ of similar construction to the break G. From the break $h'$ the line-wire H passes to a contact-point $h^2$. Adjacent to this contact-point $h^2$ is another contact-point $h^3$, and the intervening space is bridged by a "cut-out" $h^4$, connected to but insulated from the armature $c'$ of the magnet $c$. From the contact-point $h^3$ the line-wire H passes to the conductor-line B. Pivoted at $k$, so as to be within the field of the magnet $h$, is an armature K, having one arm $k'$ at an angle to the other arm $k^2$, each arm having at its end an insulated "plug" $k^3$ $k^4$. The relation of this armature and its magnet to the breaks G and $h'$ is such that when the magnet $h$ draws down the armature K the plug $k^3$ closes the break G, and when the armature K falls off or is driven off the plug $k^4$ closes the break $h'$. Pivoted at $l$, so as to be within the field of the magnet $f$, is an armature L, having an insulated plug $l'$ and the usual spring $l^2$. This armature L is so arranged that when the magnet $f$ draws down the armature L the plug $l^2$ drives out the plug $k^3$, and, taking its place, closes the break G. The parts thus described are placed in the trap, the dotted lines in Fig. 1 indicating the edges of the trap.

To the left hand of Fig. 1 is represented the appliances put on the car. M is the motor, and N the rheostat, both constructed, arranged, and connected up in the usual way.

After the lines F and H, connected together in $z$, pass into the conductor-line A, the currents of such lines, as will be hereinafter explained, pass through the wheel I, out of and into the car, respectively, and through wires therein. Hence these wires on the car will be lettered F and H, so as to more readily trace the currents. The wheel I is properly insulated, and resting against said wheel is a brush $i$, from which extends a wire $i'$. From this wire the line-wires F and H extend on the car to a "switch" or arrangement of magnets, breaks, and armatures precisely like in construction and relative location to these placed in the trap. Before the line-wire H reaches its magnet it passes through the "cut-out" $c^2$, the construction here being the same as that of the cut-out in the trap. After leaving the break $h'$ on the car, the line-wire H passes through the battery O, and the usual controlling-switch P to the other wheel I'. The line-wire F after leaving its power-magnet at the switch on the car, passes around the magnet at the cut-out $c^2$ and thence to the rheostat, motor, and to the wheel I'. As soon as the controlling-switch P is shut, the battery or local line is closed. As soon as this is done, the current flows from the battery O through the line H, the break $h'$, the plug $k^4$ being therein, the magnet $h$, the cut-out $c^2$, wire $z'$, brush $i$, wheel I, section $a$, wire $z$, and thence into the trap, through the magnet $h$, break $h'$, the plug $k^4$ being therein, contacts $h^2$ $h^3$, bridge $h^4$, conductor-line B, wheel I', line-wire H, controlling-switch P, and back to battery O. As soon as this local circuit is closed, the magnets $h$ are vitalized and draw down the armature K. This breaks the local line at the breaks $h'$, the plugs $k^4$ being withdrawn. At the same time the breaks G are closed by the plugs $k^3$ passing between the parts $g$ $g'$. As soon as the breaks G are closed, the motor-line is connected with the power-line. The current flows from the power-line C around the magnet $c$, through the line-wire F, magnet $f$, break G, the plug $k^3$ being within it, wire $z$, section $a$, wheel I, brush $i$, wire $z'$, break G, magnet $f$, cut-out $c^2$, rheostat N, motor M, wheel I', wire $d$, and return-wire D. As soon as the current flows from the power-line through the motor-line, passing around the magnet, as described, these magnets become vitalized. The armatures L are drawn down, the plugs $l'$ entering between the parts $g$ $g'$ of the breaks G, driving out the plugs $k^3$, and, taking their places, preserve the electrical armatures at the breaks G. At the same time the plugs $k^4$ enter between the parts of the breaks $h'$, so that the local circuit is ready for the next section $a$ of the conductor-line A; but if the local circuit were permitted to remain closed while the power-line was on, the current, instead of passing through the motor-line on the car and performing the required work where there was predetermined resistance, would dash through the local circuit and to the return-wire. Hence while the local circuit, after connecting the motor-line with the power-line and cutting out its own circuit to prevent grounding, and then this break in the local circuit being closed so that the local may be ready for the next section, still the local must remain broken while the power-line is on. To produce this result, the cut-offs are used. As the current from the power-line vitalizes the magnets at the cut-offs the local circuit is again broken, and it remains broken while the motor-line is connected to the power-line. Hence the break at $h'$ prevents grounding when the generator-current is first turned on by the local, and when this break is restored the cut-offs prevent grounding through the local, except for the break at $h'$, the generator-current, on reaching the section $a$, would dash through the line H, magnet $h$, to the conductor-line B, and through the wire $d$ to the return-wire D. When this break $h'$ is closed and the current is passing from the motor-line, it would, on reaching the section $a$, dash through the local to the wire D but for the opening at the cut-off, and this short-circuiting would occur though the wires F and H were independently connected to the section $a$, instead of by a common wire $z$. This arrangement of breaks and cut-offs on the trap prevents grounding through the local on that side. The similar arrangement on the car prevents grounding on the local through the other side.

Having described my invention, what I claim is—

1. In an electric-railway-conduit system, the combination of a power-line, a motor-line on a car normally out of electrical connection with the power-line, and a local circuit, part of which, including the source of electricity, is on the car, the motor-line and local circuit each having one or more breaks, those of the motor-line controlled by the local circuit and those of the latter controlled by itself and by the power-line, as set forth.

2. In an electric-railway-conduit system, the combination of a power-line, a motor-line on a car normally out of electrical connection with the power-line, and a local circuit, part of which, including the source of electricity, is on the car, each circuit provided with an electrical device which controls one of the other circuits, whereby when the local circuit is closed the motor-line is electrically connected to the power-line and the local is immediately broken, as set forth.

3. In an electrical-railway-conduit system, the combination of a power-line, a motor-line on the car normally out of electrical connection with the power-line, and a local circuit, part of which, including the source of electricity, is on the car, each circuit provided with an electrical device which controls one of the other circuits, and the local circuit having a cut-out controlled by the power-line and a break, the plug of which is connected to part of the electrical fitting of the local, which is in the power and motor lines, whereby when the local is closed the motor and power lines are connected, the local broken, the break restored, and the local cut out, thus effectually preventing grounding on either side of the local when the generator-current is turned on.

4. As an improved appliance for electric currents, the combination of the magnets $h$ and $f$, their armatures K and L, having, respectively, the plugs $k^4$, $k^3$, and $l'$, and the breaks G and $h'$, the plugs $k^3$ and $l'$ being at the break G and the plug $k^4$ at the break $h'$, as set forth.

In testimony whereof I affix my signature in presence of two witnesses.

MALONE WHELESS.

Witnesses:
M. DORIAN,
MARIAN PERRY.